(12) United States Patent
Jo et al.

(10) Patent No.: US 10,144,370 B2
(45) Date of Patent: Dec. 4, 2018

(54) CABLE HOLDER

(71) Applicant: HYUNDAI DYMOS INCORPORATED, Seosan-si, Chungcheongnam-do (KR)

(72) Inventors: Young Deok Jo, Suwon-si (KR); Hyun Kim, Hwaseong-si (KR); Il Hwan Bae, Suwon-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 15/621,232

(22) Filed: Jun. 13, 2017

(65) Prior Publication Data
US 2017/0274845 A1 Sep. 28, 2017

Related U.S. Application Data

(63) Continuation of application No. PCT/KR2015/014233, filed on Dec. 24, 2015.

(30) Foreign Application Priority Data

Dec. 26, 2014 (KR) ........................ 10-2014-0190321

(51) Int. Cl.
| | |
|---|---|
| *F16L 3/00* | (2006.01) |
| *B60R 16/02* | (2006.01) |
| *F16L 3/233* | (2006.01) |
| *F16L 3/137* | (2006.01) |
| *B65D 63/10* | (2006.01) |
| *B60N 2/68* | (2006.01) |
| *B60N 2/56* | (2006.01) |
| *B60N 2/02* | (2006.01) |

(52) U.S. Cl.
CPC ........ *B60R 16/0215* (2013.01); *B60N 2/5685* (2013.01); *B60N 2/68* (2013.01); *B65D 63/10* (2013.01); *F16L 3/137* (2013.01); *F16L 3/233* (2013.01); *B60N 2002/0264* (2013.01)

(58) Field of Classification Search
CPC .. B60N 16/0215; B60N 2/5685; B65D 63/00; B65D 63/10; F16L 3/137; F16L 3/233; F16L 3/12; F16L 3/22
USPC ........................................................... 248/73
See application file for complete search history.

(56) References Cited

U.S. PATENT DOCUMENTS

| | | | | |
|---|---|---|---|---|
| 3,023,692 A | * | 3/1962 | Crown | ................. H02G 3/0456 100/1 |
| 3,149,808 A | * | 9/1964 | Weckesser | .............. F16L 3/233 24/16 PB |
| 4,974,798 A | * | 12/1990 | Harding | ................... H02G 3/26 174/72 A |

(Continued)

FOREIGN PATENT DOCUMENTS

| | | |
|---|---|---|
| JP | 02776165 | 7/1998 |
| JP | 1999089043 | 3/1999 |

(Continued)

*Primary Examiner* — Anita M King
(74) *Attorney, Agent, or Firm* — Burris Law, PLLC

(57) ABSTRACT

Provided is a cable holder including a strap arranged in parallel with any one of a wire inserted into a car seat or a cable inserted into the seat, a fastening device which integrally couples the strap with one of the wire or the cable, and a tie which is coupled with the strap and coupled with another one of the wire or the cable.

9 Claims, 1 Drawing Sheet

(56) References Cited

U.S. PATENT DOCUMENTS

Figure 1A:
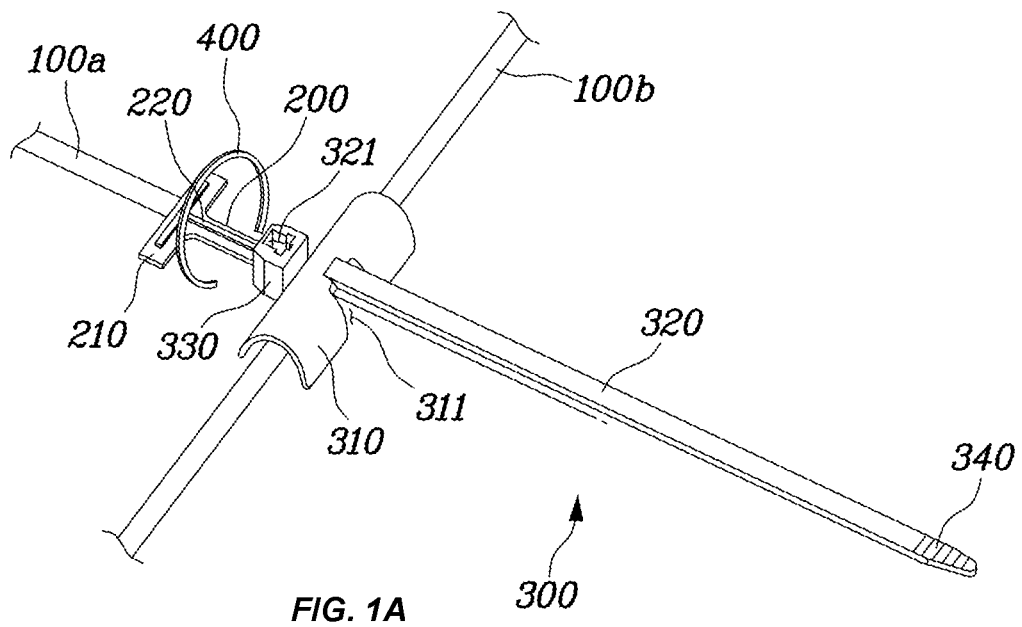

| | | | | |
|---|---|---|---|---|
| 5,106,040 A | * | 4/1992 | Cafmeyer | H02G 3/26 248/292.14 |
| 5,962,814 A | * | 10/1999 | Skipworth | B60R 16/0215 174/135 |
| 6,076,781 A | * | 6/2000 | Kraus | F16L 3/24 248/231.91 |
| 9,033,288 B2 | * | 5/2015 | Hebda | H02G 3/30 248/73 |
| 2013/0153716 A1 | * | 6/2013 | Lothamer | B60R 16/0215 248/68.1 |
| 2016/0121822 A1 | * | 5/2016 | Shaw | B60R 16/0215 248/74.3 |

FOREIGN PATENT DOCUMENTS

| | | |
|---|---|---|
| JP | 2007306760 | 11/2007 |
| KR | 1019970055010 | 7/1997 |
| KR | 2019980041498 | 9/1998 |
| KR | 1020140114055 | 9/2014 |

* cited by examiner

CABLE HOLDER

CROSS-REFERENCE TO RELATED APPLICATIONS

This application is a continuation of International application Ser. No. PCT/KR2015/014233 filed on Dec. 24, 2015, which claims the benefit of KR 10-2014-0190321, filed on Dec. 26, 2014. The disclosures of the above applications are incorporated herein by reference.

FIELD

The present disclosure relates to a cable holder for fixing an electrical component cable or a heat wire cable passing through one sheet to another sheet.

BACKGROUND

The statements in this section merely provide background information related to the present disclosure and may not constitute prior art.

Recently, various devices such as a heat wire device and a ventilation device have been installed on seats of a vehicle, and a heat wire cable and various electric component cables for supplying power and control signals to these devices have been inserted and passed through the seats.

In order to secure these devices to the seats, conventionally, a bracket provided with a number of fastening holes is installed in an insert wire to be inserted into the seat, and a fixing means for bundling the cables and coupling the cables to pass through the fastening holes has been provided. However, these devices bring with them cost and weight increase of further installation of the bracket, and since it is not necessary to install the bracket on a seat on which the electrical components are not installed, it is required to separately produce a seat with the bracket installed thereon and a seat with no bracket installed thereon. Thus, considerable inefficiency has been raised in terms of stock management and sheet sharing.

SUMMARY

The present disclosure will be described below primarily in connection with vehicle batteries or battery modules in vehicles. It is to be understood, however, that the present disclosure may be used in any application in which electrical and/or electronic assemblies have to be cooled, where a connection is made via thermally conductive material and dismounting should be possible.

The present disclosure provides a cable holder that is configured to secure an electrical component cable to a seat without a bracket, even when the electrical components are installed, so that a seat with no bracket installed thereon can be commonly used, regardless of whether various electrical components are installed.

In one form, the present disclosure provides a cable holder including: a strap arranged in parallel with any one of a wire inserted into a car seat or a cable inserted into the seat; a fastening device which integrally couples the strap with one of the wire or the cable; and a tie which is coupled with the strap, and coupled with another one of the wire or the cable.

A detachment inhibiting protrusion may be formed to protrude at one end portion of the strap so as to inhibit the fastening device and the strap from being detached from each other in the longitudinal direction of the strap in a state in which any one of the wire and the strap is integrally coupled with the strap.

The detachment inhibiting protrusion may form a T-shape or a cross shape with the strap.

The fastening device may be a split metal ring with beveled end portions.

The tie may include a support panel which is bent to form a curvature in a width direction, formed to extend along the length of the wire or the cable, and coupled to the strap; a tie band which is coupled to the support panel at a set angle to the length direction of the support panel and has a plurality of catching grooves continuously formed along its length; and a tie head which is coupled to the support panel, has a fastening hole formed so that the tie strap can be penetrated and inserted after wrapping around the cable, and the fastening hole being formed with a catching protrusion so as to be caught and coupled with the catching groove.

The support panel may be perpendicularly coupled with the strap to form a T-shape or a cross shape.

The tie band may have an end portion connected to a center portion of the support panel, and an incision groove may be formed on the support panel through which the tie band passes, so that the tie band can pass through the incision groove when the tie band wraps around the cable.

The strap may be coupled with a wire, and the tie may be coupled with the cable.

A reinforcing protrusion protruding along the length of the strap may be formed on one side of the strap.

According to the cable holder having the structure as described above, since there is not another bracket in order to fix the cable, there is an effect of reducing the cost and weight.

In addition, since common sheets with no bracket installed thereon can be shared and used, there is an effect of improving productivity and part utilization.

Also, since the cable can be fixed at various positions when fixing the cable, the degree of freedom of attachment can be improved.

Further areas of applicability will become apparent from the description provided herein. It should be understood that the description and specific examples are intended for purposes of illustration only and are not intended to limit the scope of the present disclosure.

DRAWINGS

Figure 1B:
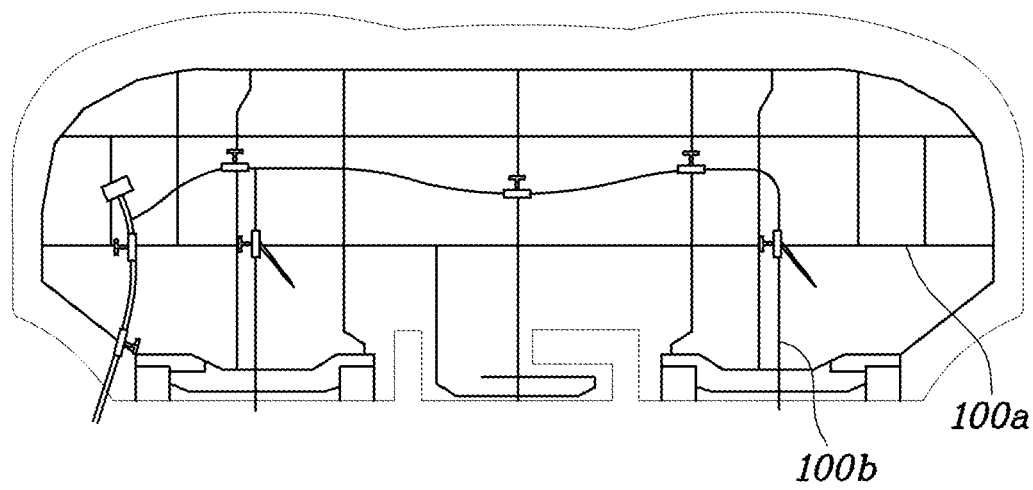

In order that the disclosure may be well understood, there will now be described various forms thereof, given by way of example, reference being made to the accompanying drawings, in which:

FIG. 1A is a perspective view of a cable holder according to one form of the present disclosure; and FIG. 1B is a schematic diagram illustrating an exemplary location for the cable holder of FIG. 1A in a car seat.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, variations of the present disclosure will be described in detail with reference to the accompanying drawings. The drawings attached hereto are to help explain exemplary forms of the present disclosure, and the present disclosure is not limited to the specific drawings and forms corresponding thereto.

Hereinafter, a cable holder according to one form of the present disclosure will be described with reference to the accompanying drawings.

Referring to FIGS. 1A and 1B a cable holder according to one form of the present disclosure includes a strap 200 arranged in parallel with any one of a wire 100*a* inserted into a car seat or a cable 100*b* inserted into the seat; a fastening device 400 which integrally couples the strap 200 with one of the wire 100*a* or the cable 100*b*; and a tie 300 which is coupled with the strap 200, and coupled with another one of the wire 100*a* or the cable 100*ba*.

Specifically, in one form the strap 200 is coupled with the wire 100*a*, and the tie 300 is coupled with the cable 100*b*. The reason is that since the wire 100*a* is in a state of being inserted into the seat pad, it is desirable to couple the seat pad by the fastening device 400 so that it can be coupled with the wire 100*a* through the seat pad. Of course, it is not necessarily limited thereto, and the strap 200 may be coupled to the cable 100*b* and the tie 300 may be coupled to the wire 100*a* while remaining within the scope of the present disclosure.

The fastening device 400 can have various forms of fastening structures which can penetrate through the seat pad and tie the wire and the periphery of the strap 200 together, and in one form is a split metal ring with beveled end portions (also known in the art as a "hog ring"). By using such a ring, the strap 200 and the wire 100*a* can be easily coupled together, and it is possible to secure both pieces efficiently and securely.

Meanwhile, the strap 200 is made of plastic or a steel material to allow the cable 100*b* to be rigidly supported by the wire 100*a* even when the sheet is shaken due to shock, thereby making it possible to the cable 100*b* from being unstably separated or shaken.

In addition, a reinforcing protrusion 220 protruding along the length is formed on one side of the strap 200, so that the stiffness of the strap 200 against deflection, bending and twisting can be enhanced. The reinforcing protrusion 220 may be additionally formed or installed in the strap 200 or may be formed by folding the strap 200.

Also, a detachment inhibiting protrusion 210 may be formed to protrude at one end portion of the strap 200 so as to inhibit the fastening device 400 and the strap 200 from being detached from each other in the longitudinal direction of the strap 200 in a state in which the wire 100*a* and the strap 200 are integrally coupled with each other.

The detachment inhibiting protrusion 210 may be formed to protrude in the side direction of the strap 200, and in one form, the detachment inhibiting protrusion 210 may be formed to protrude so as to form a T-shape or a cross shape with the strap 200. Of course, the reinforcing protrusion 220 may also be formed on the detachment inhibiting protrusion 210, and in accordance with the formation of the detachment inhibiting protrusion 210, when the strap 200 is coupled with the wire 100*a* by the fastening device 400, it is possible to inhibit the strap 200 from moving in the longitudinal direction and being detached from the fastening device 400. That is, even when the strap 200 moves in the longitudinal direction, the fastening device is caught by the detachment inhibiting protrusion 210 to inhibit the strap 200 from being detached. Therefore, the protrusion length of the detachment inhibiting protrusion 210 is set to extend to the outside of the fastening device 400.

Meanwhile, the tie 300 may include a support panel 310 which is bent along the curvature of the outer diameter of the cable 100*b*, formed to extend along the length of the cable 100*b*, and coupled to the strap 200; a tie band 320 which is coupled to the support panel 310 at a set angle to the length direction of the support panel 310 and has a plurality of catching grooves 340 continuously formed along its length; and a tie head 330 which is coupled to the support panel 310, has a fastening hole 321 formed so that the tie strap 200 can be penetrated and inserted after wrapping around the cable 100*b*, and the fastening hole 321 is formed with a catching protrusion (not shown) so as to be caught and coupled with the catching groove.

In one form, the support panel 310 be bent so as to form a curvature in the width direction and cover a part of the outer peripheral surface of the cable 100*b*, and by being formed to have a predetermined length, the support panel 310 can perform a function of supporting and pressurizing the cable 100*b* so as to be in close contact with the seat pad side. Also, it is possible to inhibit the cable 100*b* other than the coupled point between the tie strap 200 and the cable 100*b* from being loosened as compared with the case of simply fixing the cable 100*b* only with the tie strap. Further, the curvature does not necessarily coincide with the outer diameter of the cable 100*b*, and the curvature may be variously set.

Also, the support panel 310 may be vertically coupled to the other end portion of the strap 200 so as to form a T-shape or a cross shape, and thus, the support panel 310 can perform the same function as the detachment inhibiting protrusion 210. Of course, this is the case of one form of the present disclosure, and the angle or shape formed between the strap 200 and the support panel 310 can be variously set.

On the other hand, the tie band 320 has one end portion connected to a center portion of the support panel 310, and an incision groove 311 is formed on the support panel 310 through which the tie band 320 passes, so that the tie band 320 can pass through the incision groove 311 when the tie band 320 wraps around the cable 100*b*.

One end portion of the tie band 320 may be coupled to a center portion in the width direction of the support panel 310, and since the incision groove 311 is formed so as to open from a center portion in the width direction of the support panel 310 to the outer side in the width direction, when the tie band 320 wraps around the cable 100*b*, the tie band is allowed to wrap around only the cable without wrapping around the support panel 310 together, thereby making it possible to bend the cable 100*b* without clearance. Of course, the incision groove 311 can be formed on both outer sides in the width direction with reference to the central portion of the support panel 310 in the width direction, and in one form the tie head 330 is provided and fastened to the tie band 320 at a point where the tie band 320 wraps around the cable 100*b* and returns to the support panel 310 side again.

Since the catching protrusion of the tie head 330 protrudes to form an inclined path along the insertion direction of the tie band 320 within the fastening hole 321 of the tie head 330, as the tie band 320 is inserted and then is caught by catching groove, the catching protrusion is formed to inhibit the extraction in a reverse direction so that the tie band 320 can perform the banding function.

According to the cable holder having the structure as described above there is an effect of reducing the cost and weight.

In addition, since cables can be fixed to common sheets on which brackets are not installed, and sheets can be shared and used, there is an effect of improving productivity and part utilization.

Also, when fixing the cable, since the cable can be fixed at various positions, the degree of freedom of installation can be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cable holder comprising:
   a strap arranged in parallel with at least one of a wire inserted into a car seat and a cable inserted into the car seat;
   a fastening device configured to couple the strap with one of the wire or the cable; and
   a tie coupled with the strap and coupled with another one of the wire or the cable,
   wherein a detachment inhibiting protrusion is formed at one end portion of the strap so as to inhibit the fastening device and the strap from being detached from each other in a longitudinal direction of the strap in a state in which any one of the wire and the strap is integrally coupled with the strap,
   wherein the detachment inhibiting protrusion forms a T-shape with the strap.

2. The cable holder according to claim 1, wherein the fastening device is a split metal ring with beveled end portions.

3. The cable holder according to claim 1, wherein the strap is coupled with a wire and the tie is coupled with the cable.

4. The cable holder according to claim 1, wherein a reinforcing protrusion protrudes along a length of the strap and is formed on one side of the strap.

5. A cable holder comprising:
   a strap arranged in parallel with at least one of a wire inserted into a car seat and a cable inserted into the seat;
   a fastening device configured to couple the strap with at least one of the wire and the cable; and
   a tie coupled with the strap and with another one of the wire or the cable, wherein the tie comprises:
      a support panel forming a curvature in a width direction, formed to extend along a length of the wire or the cable and being coupled to the strap;
      a tie band coupled to the support panel at a set angle to a length direction of the support panel and having a plurality of catching grooves continuously formed along its length; and
      a tie head coupled to the support panel and having a fastening hole formed so that the tie band can be penetrated and inserted after wrapping around the cable, and the fastening hole being formed with a catching protrusion so as to be caught and coupled with the catching groove.

6. The cable holder according to claim 5, wherein the fastening device is a split metal ring with beveled end portions.

7. The cable holder according to claim 5, wherein the tie band has an end portion connected to a center portion of the support panel, and an incision groove is formed on the support panel through which the tie band passes, so that the tie band can pass through the incision groove when the tie band wraps around the cable.

8. The cable holder according to claim 5, wherein the strap is coupled with a wire and the tie is coupled with the cable.

9. The cable holder according to claim 5, wherein a reinforcing protrusion protrudes along a length of the strap and is formed on one side of the strap.

* * * * *